US008985865B2

(12) United States Patent
Howard et al.

(10) Patent No.: US 8,985,865 B2
(45) Date of Patent: Mar. 24, 2015

(54) UNITARY FIBER OPTIC FERRULE AND ADAPTER THEREFOR

(75) Inventors: Joseph P. Howard, Hickory, NC (US); Darrell R. Childers, Hickory, NC (US); Russell J. Granger, Vale, NC (US)

(73) Assignee: US Conec, Ltd., Hickory, NC (US)

( * ) Notice: Subject to any disclaimer, the term of this patent is extended or adjusted under 35 U.S.C. 154(b) by 1503 days.

(21) Appl. No.: 12/540,193

(22) Filed: Aug. 12, 2009

(65) Prior Publication Data

US 2010/0135618 A1      Jun. 3, 2010

Related U.S. Application Data

(60) Provisional application No. 61/118,589, filed on Nov. 28, 2008.

(51) Int. Cl.
G02B 6/36 (2006.01)
G02B 6/38 (2006.01)
G02B 6/42 (2006.01)

(52) U.S. Cl.
CPC ............... G02B 6/36 (2013.01); G02B 6/3829 (2013.01); *G02B 6/3845* (2013.01); *G02B 6/3853* (2013.01); G02B 6/3885 (2013.01); *G02B 6/3893* (2013.01); G02B 6/4292 (2013.01)
USPC ............................................. 385/79; 385/93

(58) Field of Classification Search
CPC ...... G02B 6/3865; G02B 6/4214; G02B 6/43; G02B 6/4204; G02B 6/4255; G02B 6/4249; G02B 6/4246
See application file for complete search history.

(56) References Cited

U.S. PATENT DOCUMENTS

| 4,826,272 | A | 5/1989 | Pimpinella et al. |
| 4,836,637 | A | 6/1989 | Poorman et al. |
| 4,913,510 | A | 4/1990 | Lynch et al. |
| 5,515,468 | A | 5/1996 | DeAndrea et al. |
| 5,708,743 | A | 1/1998 | Deandrea et al. |
| 5,892,872 | A | 4/1999 | Glover |
| 6,040,934 | A | 3/2000 | Ogusu et al. |
| 6,282,000 | B1 | 8/2001 | Kikuchi et al. |
| 6,328,484 | B1 | 12/2001 | Uebbing |
| 6,434,308 | B1 | 8/2002 | Trezza |
| 6,526,204 | B1 | 2/2003 | Sherrer et al. |
| 6,587,421 | B1 | 7/2003 | Wilde et al. |
| 6,636,540 | B2 | 10/2003 | Uebbing |
| 6,668,113 | B2 | 12/2003 | Togami et al. |
| 6,751,379 | B2 | 6/2004 | Capewell et al. |
| 6,759,687 | B1 | 7/2004 | Miller et al. |
| 6,821,027 | B2 | 11/2004 | Lee et al. |
| 6,888,988 | B2 * | 5/2005 | Vancoille et al. ............... 385/47 |
| 6,901,185 | B2 | 5/2005 | Sasaki et al. |
| 6,939,058 | B2 * | 9/2005 | Gurevich et al. ............... 385/93 |
| 6,953,291 | B2 | 10/2005 | Liu |
| 7,021,833 | B2 | 4/2006 | Loh et al. |

(Continued)

FOREIGN PATENT DOCUMENTS

JP          2001051162  A  *  2/2001  ............... G02B 6/42

*Primary Examiner* — Rhonda Peace
(74) *Attorney, Agent, or Firm* — Michael L. Leetzow, P.A.

(57) ABSTRACT

A unitary fiber optic ferrule reflects light off an interior lens and through the fiber optic ferrule. Optical fibers can be easily secured in the unitary fiber optic ferrule. An adapter to secure the unitary fiber optic ferrule to a optical component assembly is also presented. The adapter provides a sealing function for the lenses and to provide routing for optical fibers from other assemblies of unitary fiber optic ferrules and adapters.

24 Claims, 18 Drawing Sheets

(56) References Cited

U.S. PATENT DOCUMENTS

| | | | |
|---|---|---|---|
| 7,048,449 B2 | 5/2006 | Froejdh et al. | |
| 7,063,467 B2 * | 6/2006 | Nagasaka et al. | 385/88 |
| 7,108,432 B2 * | 9/2006 | Nagasaka | 385/89 |
| 7,118,293 B2 * | 10/2006 | Nagasaka et al. | 385/89 |
| 7,189,007 B2 * | 3/2007 | Imanbayev et al. | 385/77 |
| 7,197,224 B2 | 3/2007 | Rolston et al. | |
| 7,287,914 B2 * | 10/2007 | Fujiwara et al. | 385/88 |
| 7,331,720 B1 | 2/2008 | McColloch | |
| 7,404,679 B2 * | 7/2008 | Ebbutt et al. | 385/78 |
| 7,473,038 B2 * | 1/2009 | Fujiwara et al. | 385/88 |
| 7,534,052 B2 * | 5/2009 | Fujiwara et al. | 385/88 |
| 7,539,367 B2 * | 5/2009 | Tamura et al. | 385/14 |
| 7,543,994 B2 * | 6/2009 | McColloch | 385/89 |
| 7,547,151 B2 * | 6/2009 | Nagasaka | 385/93 |
| 7,559,702 B2 * | 7/2009 | Fujiwara et al. | 385/88 |
| 8,262,297 B2 * | 9/2012 | Castagna et al. | 385/90 |
| 8,277,129 B2 * | 10/2012 | Sabano et al. | 385/83 |
| 8,277,130 B2 * | 10/2012 | Nishimura et al. | 385/83 |
| 8,469,610 B2 * | 6/2013 | Shao et al. | 385/93 |
| 8,483,571 B2 * | 7/2013 | McColloch et al. | 398/141 |
| 8,491,197 B2 * | 7/2013 | Tamura et al. | 385/61 |
| 8,641,296 B2 * | 2/2014 | Nishimura | 385/92 |
| 2004/0202477 A1 * | 10/2004 | Nagasaka et al. | 398/138 |
| 2004/0234210 A1 * | 11/2004 | Nagasaka et al. | 385/88 |
| 2006/0210225 A1 | 9/2006 | Fujiwara et al. | |
| 2007/0140628 A1 * | 6/2007 | Ebbutt et al. | 385/89 |
| 2009/0116793 A1 * | 5/2009 | Nishimura et al. | 385/78 |
| 2009/0154884 A1 * | 6/2009 | Chen et al. | 385/79 |
| 2009/0252455 A1 * | 10/2009 | Ohta et al. | 385/42 |
| 2010/0135618 A1 * | 6/2010 | Howard et al. | 385/79 |
| 2011/0091167 A1 * | 4/2011 | Nishimura | 385/88 |
| 2011/0317959 A1 * | 12/2011 | Ohta et al. | 385/38 |
| 2013/0089293 A1 * | 4/2013 | Howard et al. | 385/79 |

\* cited by examiner

UNITARY FIBER OPTIC FERRULE AND ADAPTER THEREFOR

REFERENCE TO RELATED CASE

This application claims priority under 35 U.S.C. §119(e) to provisional application No. 61/118,589, filed on Nov. 28, 2008, which is hereby incorporated by reference in its entirety.

BACKGROUND OF THE INVENTION

Field of the Invention

A low cost, simple-to-manufacture fiber optic ferrule, adapter, and related assembly is needed in high speed applications. One possible alternative is the MTP connector system, but with the available space for the connections becoming smaller, a smaller format is needed. Similarly, a more simplified connector with a ferrule is also needed so that the connections can be made quickly, reliably, and with minimal parts.

SUMMARY OF THE INVENTION

The present invention is directed to a unitary fiber optic ferrule that includes a main body having a front end, a back end, and a middle portion disposed between the front end and back end, a first opening extending between the back end and the middle portion, the first opening configured to receive at least two optical fibers and having a front wall, a plurality of lenses in optical alignment with the front wall, each of the plurality of lenses having at least one surface exposed to air, and at least two guide pins to align the unitary fiber optic ferrule.

In some embodiments, the lenses are disposed in a pocket and below the upper surface of the main body.

In some embodiments, there is an optical surface on a bottom surface of the main body, the optical surface in optical alignment with the plurality of lenses.

In some embodiments, there are more than one plurality of lenses.

In some embodiments, the fiber optic ferrule is molded from an optically clear material.

In another aspect, the invention is directed to an adapter to hold and align a unitary fiber optic ferrule that includes a main body having a front end, a back end, and an opening extending therebetween, a first projection extending from the front end and orthogonal to the opening, a second projection extending from the second end and orthogonal to the opening, and a cover portion extending between the front end and back end and partially defining the opening, the cover portion disposed to cover an opening in the unitary fiber optic ferrule.

In yet another aspect, the invention is directed to a fiber optic connector assembly that includes a unitary fiber optic ferrule that includes a main body having a front end, a back end, and a middle portion disposed between the front end and back end, a first opening extending between the back end and the middle portion, the first opening configured to receive at least two optical fibers and having a front wall, a plurality of lenses in optical alignment with the front wall, each of the plurality of lenses having at least one surface exposed to air, and at least two guide pins to align the unitary fiber optic ferrule; and an adapter to hold and align the unitary fiber optic ferrule, the adapter includes a main body having a front end, a back end, and an opening extending therebetween, a first projection extending from the front end and orthogonal to the opening, a second projection extending from the back end and orthogonal to the opening, and a cover portion extending between the front end and back end and partially defining the opening, the cover portion disposed to cover an opening in the unitary fiber optic ferrule.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
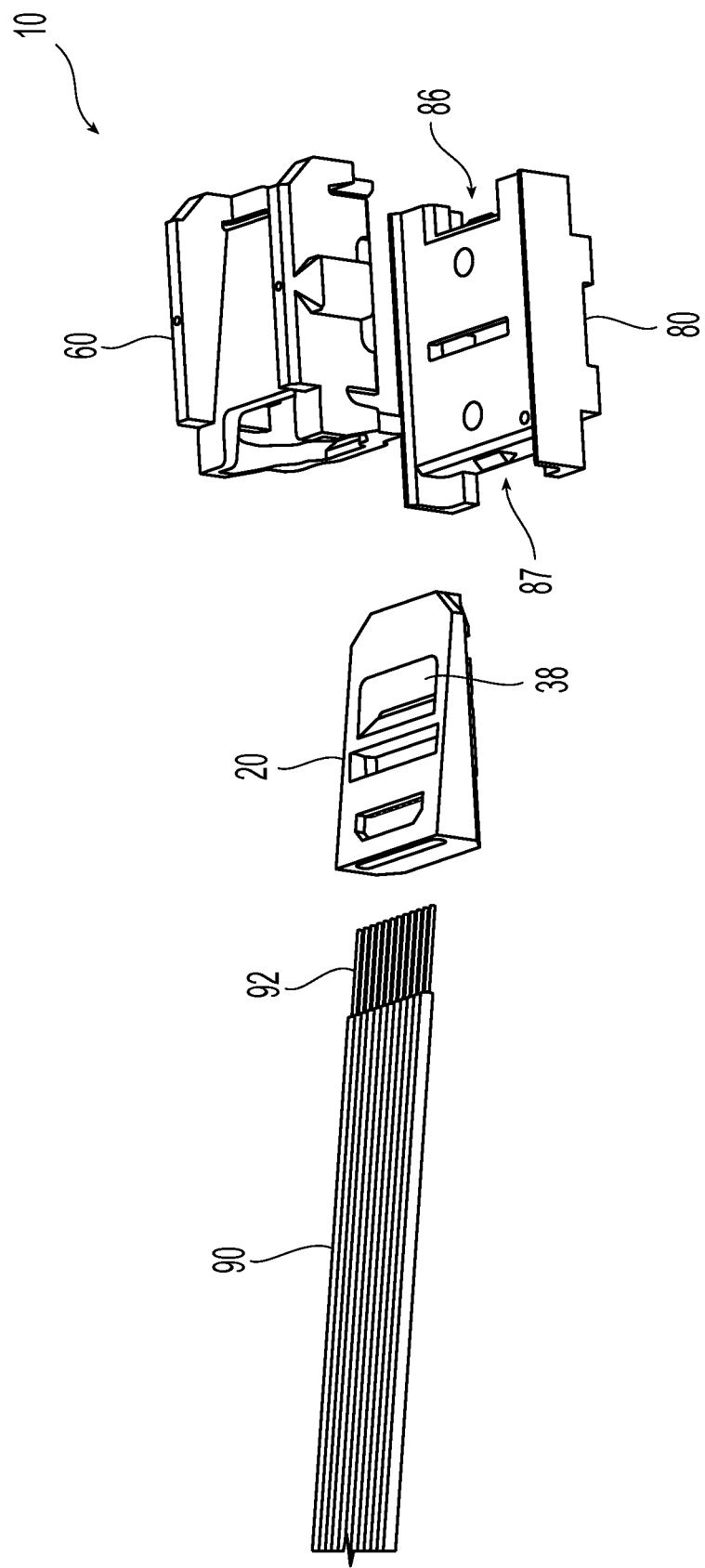
FIG. 1 is a top perspective exploded view of one embodiment of a unitary fiber optic ferrule, adapter, optical component portion, and fiber optic ribbon according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
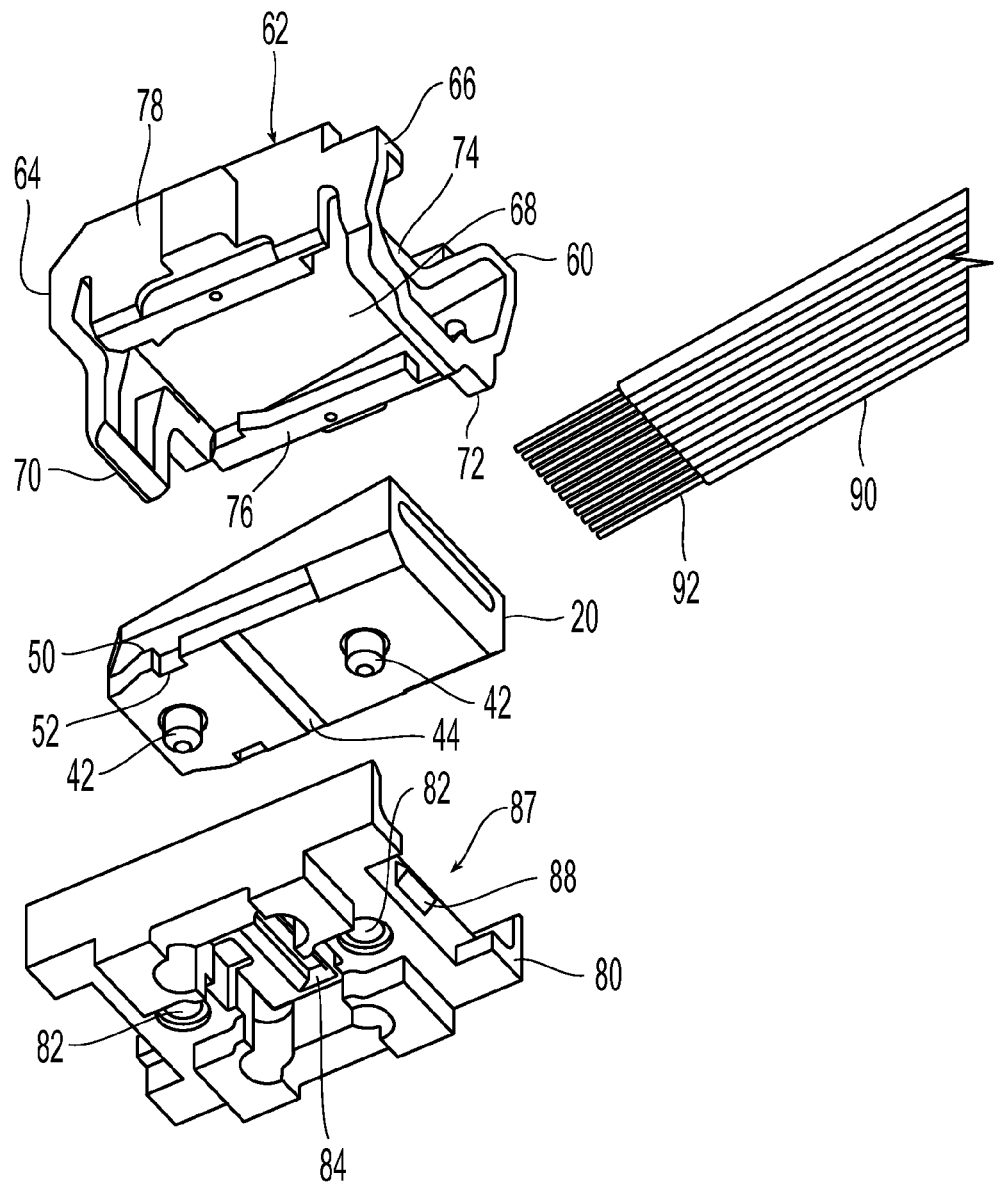
FIG. 2 is a bottom perspective exploded view of the unitary fiber optic ferrule, adapter, optical component portion, and fiber optic ribbon of FIG. 1.
Figure 3:
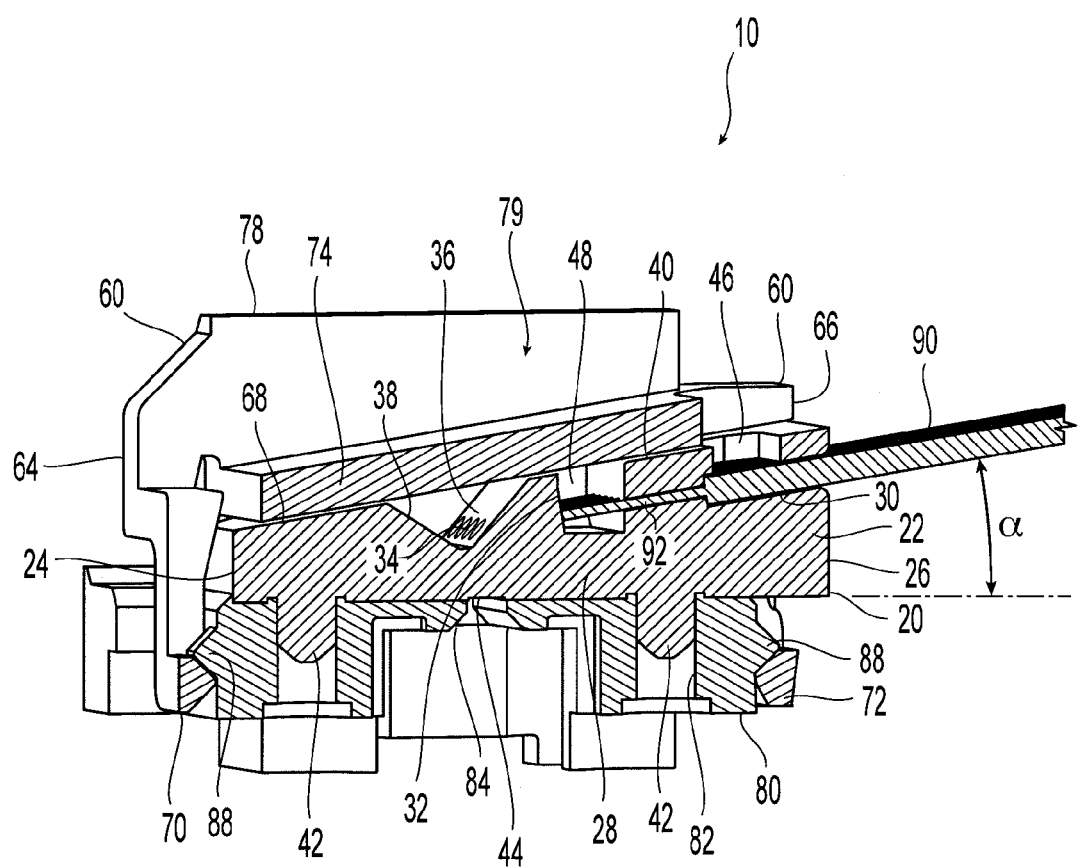
FIG. 3 is a cross sectional view of an assembly of the unitary fiber optic ferrule, adapter, optical component portion, and fiber optic ribbon ribbon of FIG. 1.
Figure 4:
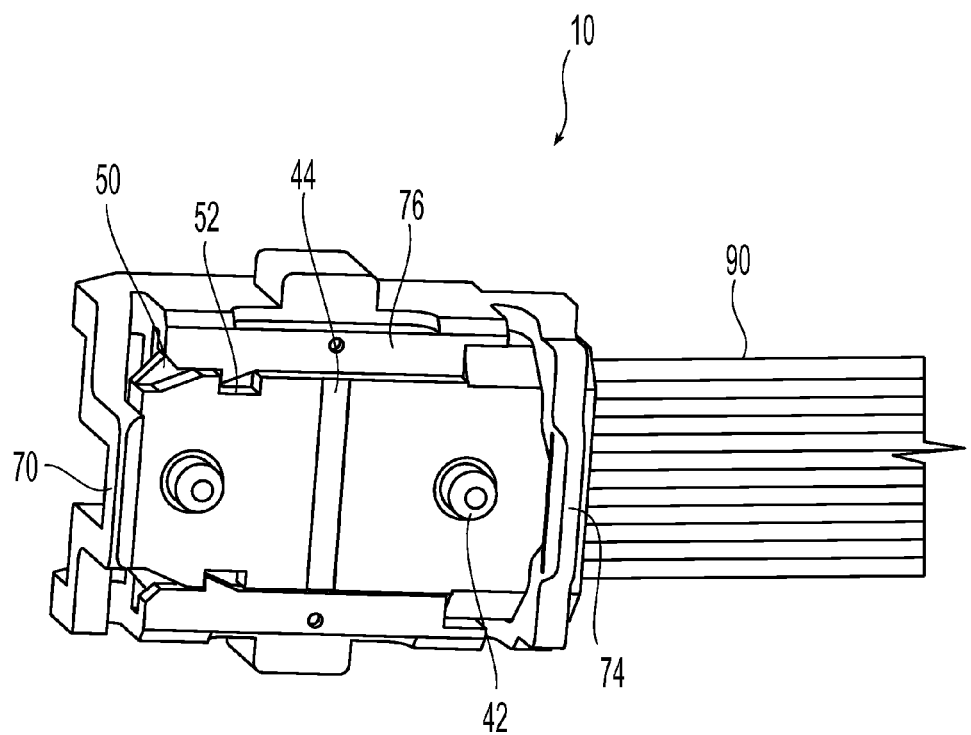
FIG. 4 is a bottom view of the unitary fiber optic ferrule in the adapter of FIG. 1.

Referring to FIGS. 1 and 2, an exploded perspective view of a fiber optic connector assembly 10, according to one embodiment of the present invention, includes a unitary fiber optic ferrule 20, an adapter 60, an optical component portion 80, and fiber optic ribbon 90. As best seen in FIG. 3, the unitary fiber optic ferrule 20 includes a main body 22 having a front end 24, a back end 26, and a middle portion 28 disposed between the front end 24 and back end 26. The unitary fiber optic ferrule 20 also has a first opening 30 extending between the back end 26 and the middle portion 28, the first opening 30 is configured to receive the fiber optic ribbon 90 and having a front wall 32. The unitary fiber optic ferrule 20 also has a plurality of lenses 34 in optical alignment with the front wall 32 and each of the lenses 34 having at least one surface 36 exposed to air. As illustrated, the lenses 34 are exposed to air in a pocket 38 that is below an upper surface 40 of the main body 22. The main body 22 also has at least two guide pins 42 to align the unitary fiber optic ferrule 20 with respect to the adapter 60 and the optical component portion 80, as described below.

The unitary fiber optic ferrule 20 is molded in a single mold and does not require any assembly. The main body 22, lenses 34, the first opening 30, and pocket 38 are all molded at the same time.

The fiber optic ribbon 90 has optical fibers 92 therein and the first opening 30 is configured to receive at least two optical fibers 92 therein. The front portion of the optical fibers 92 have been stripped and inserted into the first opening 30. The optical fibers 92 (and fiber optic ribbon 90) may be inserted so that the optical fibers 92 engage the front wall 32. However, it is also possible that the optical fibers 92 stop short of the front wall 32. The optical fibers 92 are optically and mechanically aligned with the lenses 34, preferably by using fiber microholes 35 to achieve better alignment with the lenses 34. While a fiber optic ribbon 90 is illustrated, it is also possible to use individual optical fibers and/or multiple fiber optic ribbons. The lenses 34 reflect the light from the optical fibers 92 downward due to the index changes between the air in the pocket 38 and the optically clear polymer that is used to mold the main body 22. The light is reflected to an optical surface 44 in the bottom surface of the main body 22 and out of the unitary fiber optic ferrule 20. Additionally, the first opening 30 is at an angle α relative to the bottom surface of main body 22 (and the transceiver) and the optical surface 44, the angle preferably being about 9 degrees. The top surface 40 is also disposed at an angle relative to the bottom surface of the main body 22 and the optical surface 44. The angle formed by first opening 30 and bottom surface and the angle formed by the top surface 40 and the bottom surface can be between zero degrees (parallel) and about 30 degrees, although other angles are possible. The light may also travel in the opposite direction, depending on whether the ferrule is attached to a transceiver, receiver or a transceiver, referred to herein as an "optical component assembly."

The unitary fiber optic ferrule 20 also preferably has two other openings 46,48 in the upper surface 40 to allow an index matched epoxy to be used to secure the fiber optic ribbon 90 in the first opening 46 and the optical fibers 92 in the second opening 48.

The main body 22 also has two recessed portions 50 in the bottom surface to engage the adapter or connector 60. The recessed portions 50 may also have a cut-out portion 52 that engage a corresponding projection from the adapter 60 to secure the unitary fiber optic ferrule 20 in the adapter 60.

The adapter 60 has a main body 62 having a front end 64, a back end 66, and an opening 68 extending therebetween. The adapter 60 also has a first projection 70 extending downward from the front end 64 and orthogonal to the opening 68. The adapter 60 also has a second projection 72 extending downward from the back end 66 and orthogonal to the opening 68. The first projection 70 is not as wide as the second projection 72 to prevent the adapter 60 (and unitary fiber optic ferrule 20) from being inserted into the optical component portion 80 backwards as described below. The adapter 60 also has a cover portion 74 extending between the front end 64 and back end 66 and partially defining the opening 68, the cover portion 74 disposed to cover the pocket 38 in the unitary fiber optic ferrule 20. The cover portion 74 seals the pocket 38 and the opening 48 from dust, oil, moisture, or other contaminants to ensure that the lenses 34 do not become contaminated, degrading their reflective properties. The adapter 60 also has side projections 76 that engage the recessed portions 50 of the unitary fiber optic ferrule 20 as discussed above. The upper surface of the cover portion 74 and two side walls 78 make a fiber routing channel 79 for other fiber optic ribbons associated with other assemblies, especially in a tightly packed system. Typically, the other assemblies are spaced close to one another and the angle of the top surface 40 and the first opening 30 allow for proper handling and management of the optical fibers of the adjacent assemblies.

Figure 5:
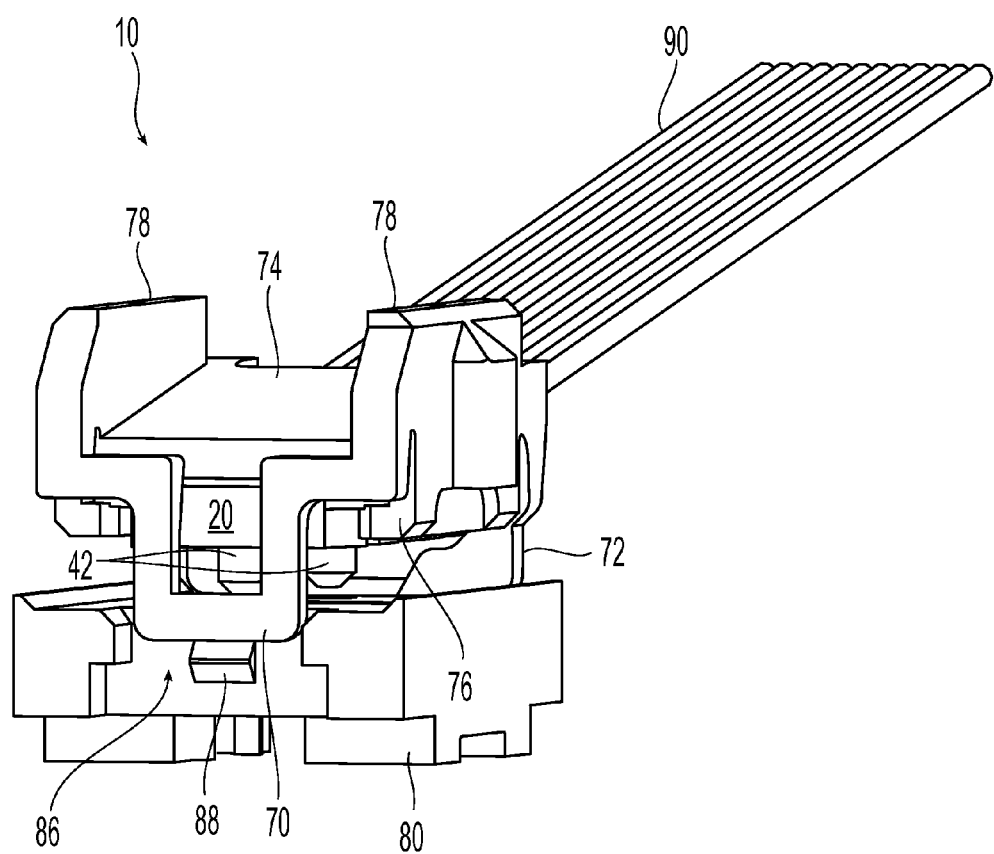
FIG. 5 is a front view of the the unitary fiber optic ferrule and adapter of FIG. 1 in alignment with the optical component portion.
Figure 6:
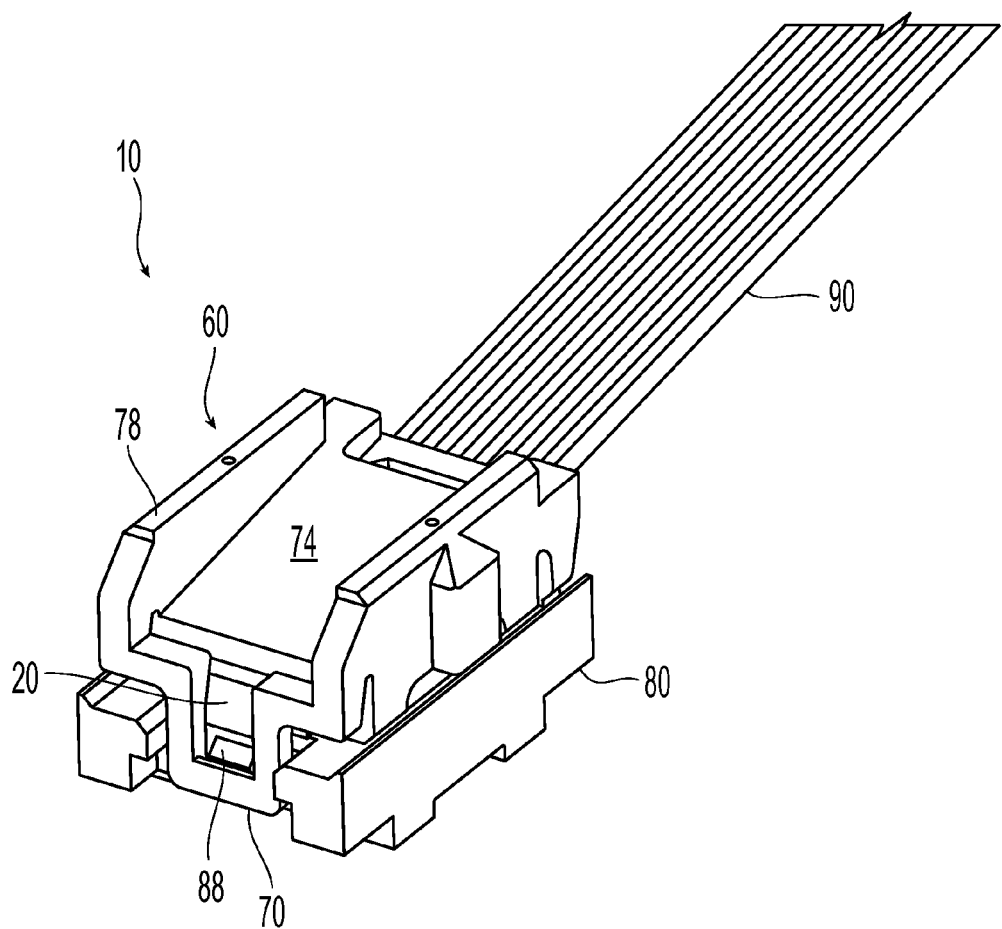
FIG. 6 is a top perspective view of an assembly of a unitary fiber optic ferrule, adapter, optical component portion, and fiber optic ribbon of FIG. 1.
Figure 7:
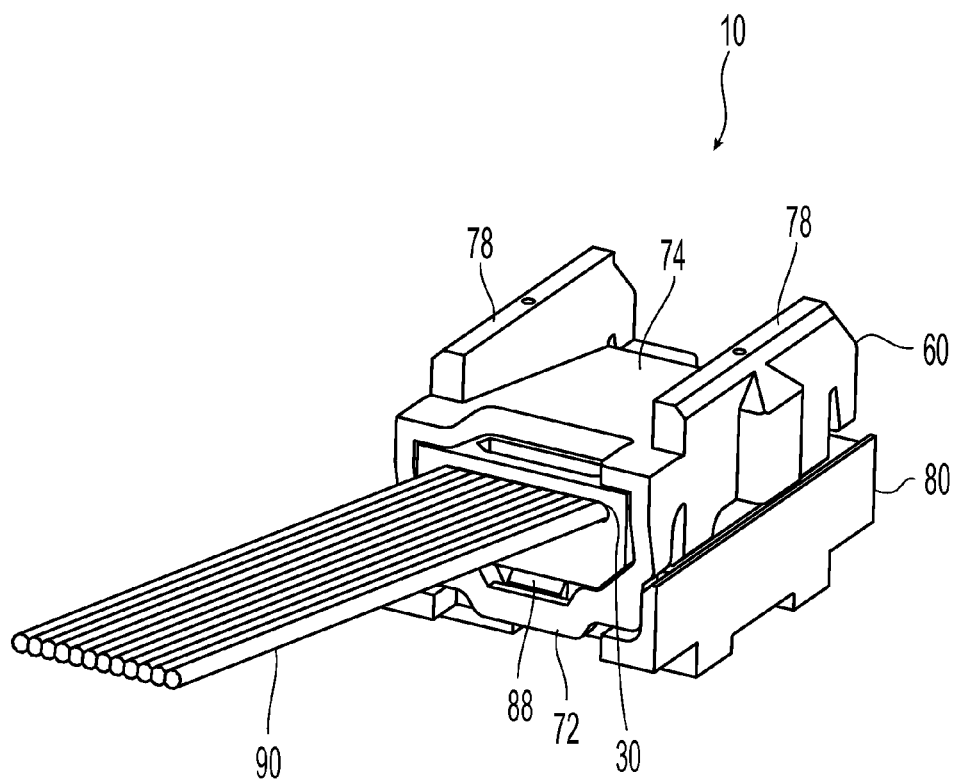
FIG. 7 a rear perspective view of an assembly of the unitary fiber optic ferrule, adapter, optical component portion, and fiber optic ribbon of FIG. 1.
Figure 8:
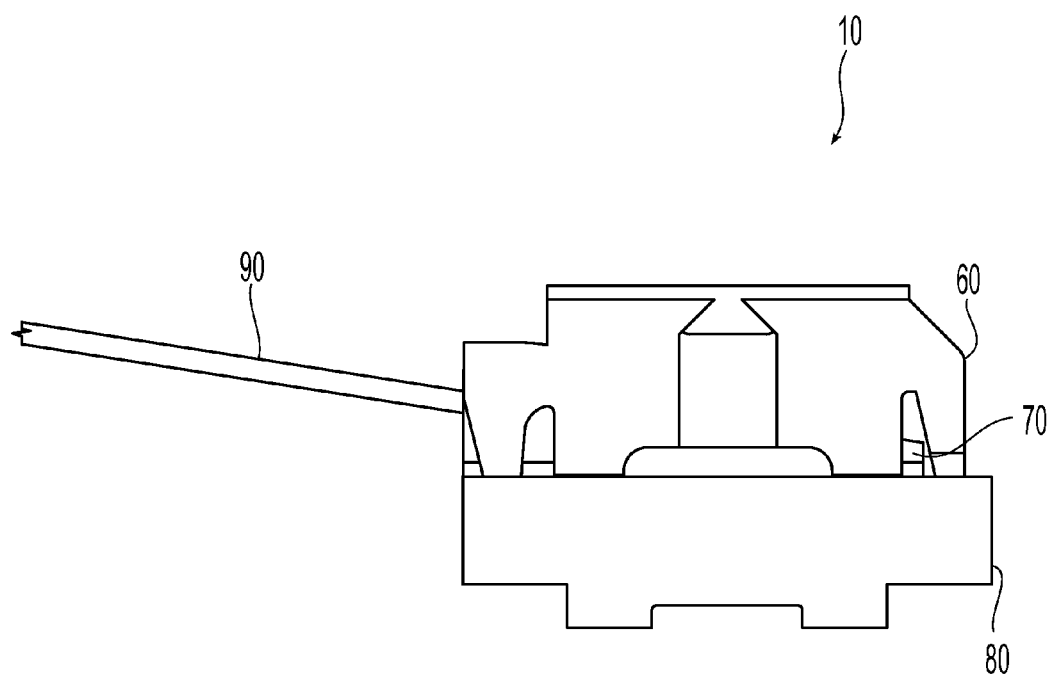
FIG. 8 is a side view of the assembly of a unitary fiber optic ferrule, adapter, optical component portion, and fiber optic ribbon of FIG. 1.
Figure 9:
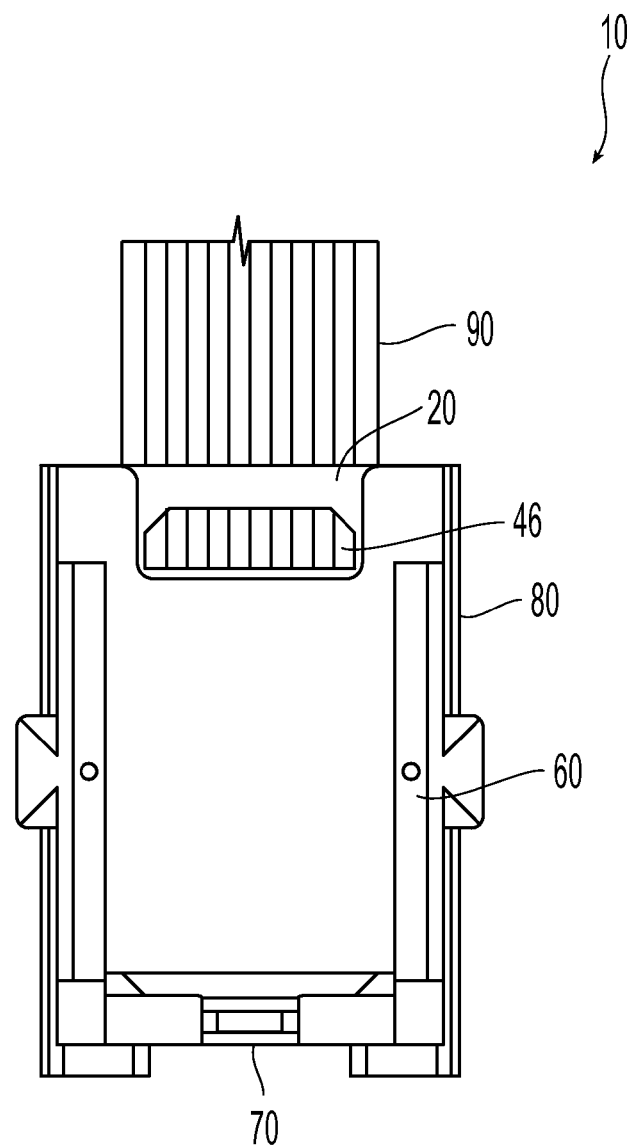
FIG. 9 is a top view of the assembly of a unitary fiber optic ferrule, adapter, optical component portion, and fiber optic ribbon of FIG. 1.
Figure 10:
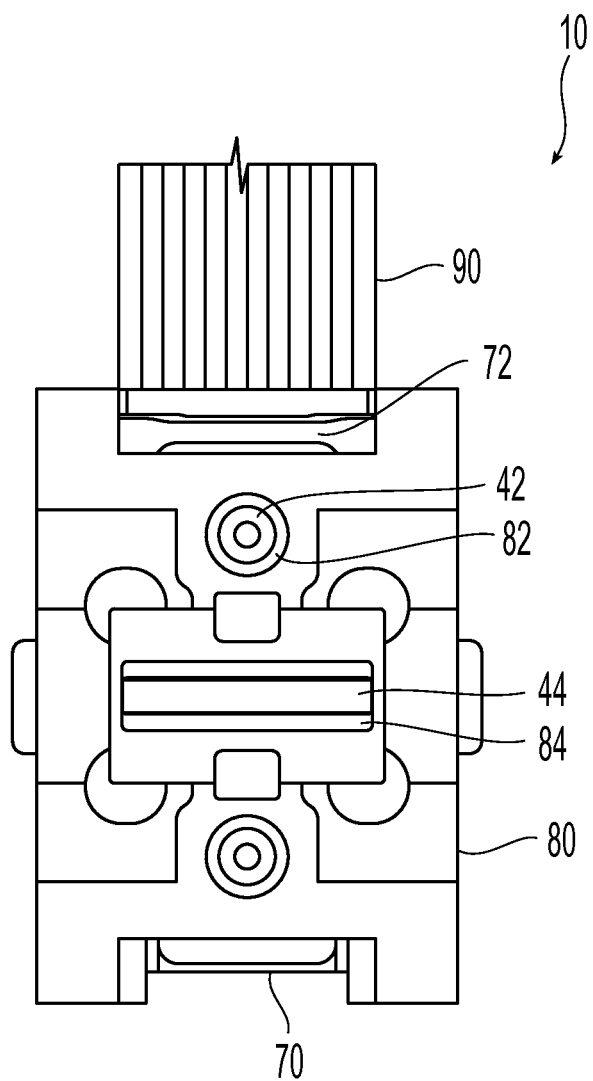
FIG. 10 is a bottom view of the assembly of a unitary fiber optic ferrule, adapter, optical component portion, and fiber optic ribbon of FIG. 1.

The optical component portion 80 illustrated in the figures is only representative of the possible configurations that could be used with the unitary fiber optic ferrule 20 and the adapter 60. See also FIGS. 13-17. The optical component portion 80 has two openings 82 configured to receive the two guide pins 42 to align the unitary fiber optic ferrule 20 with respect to the adapter 60 and the optical component portion 80. The optical component portion 80 also has an optical opening 84 that corresponds to the optical surface 44 in the bottom surface of the main body 22 to allow the light to pass between the optical fibers 92 and the optical component assembly. It should be noted that while a transceiver is generally illustrated here, the optical component portion could be attached to a transceiver, a receiver (where light passes only from the fibers to the receiver) or a transmitter (where the light passes from the transmitter to the fibers). The front end of the optical component portion 80 has a smaller opening 86 (see FIGS. 1 & 5) than the opening 87 (see FIGS. 1 & 2) at rear end, thereby preventing the adapter 60 from being misaligned with respect to the optical component portion 80. That is, the wider second projection 72 will not fit within the smaller opening 86, thereby alerting the user to turn the adapter 60 around. Thus, the first projection 70 and second projection 72 are used to first generally align the adapter 60 and unitary fiber optic ferrule 20 with the optical component assembly, and then the guide pins 42 mate within the openings 82 to finally optically align the components. The optical component portion 80 also has projections 88 that engage at least a portion of the first projection 70 and second projection 72 to tightly hold the adapter 60 on the optical component portion 80.

Figure 11:
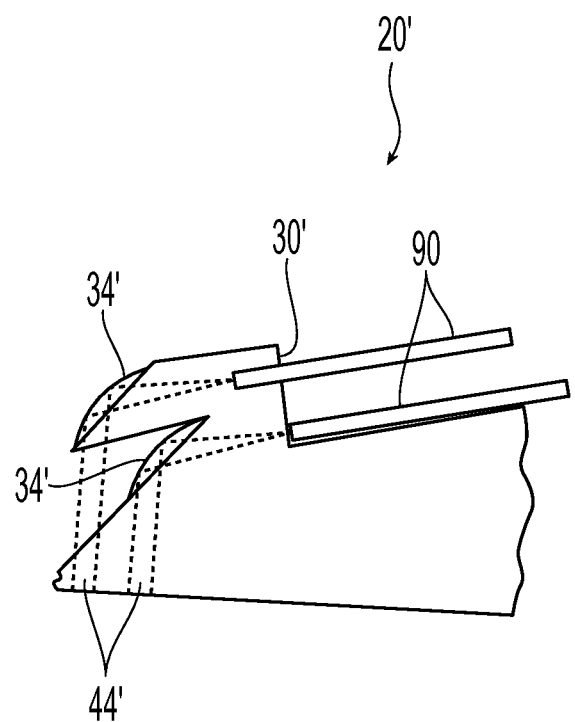
FIG. 11 is a partial view of another embodiment of a ferrule having two rows of optical fibers and lenses to illustrate doubling the density of a fiber optic ferrule according to the present invention.

It should be noted that the unitary fiber optic ferrule 20 may also have two or more rows of openings, lenses, and optical surfaces to increase the density of optical fibers in the connector as illustrated in FIG. 11.

Figure 12:
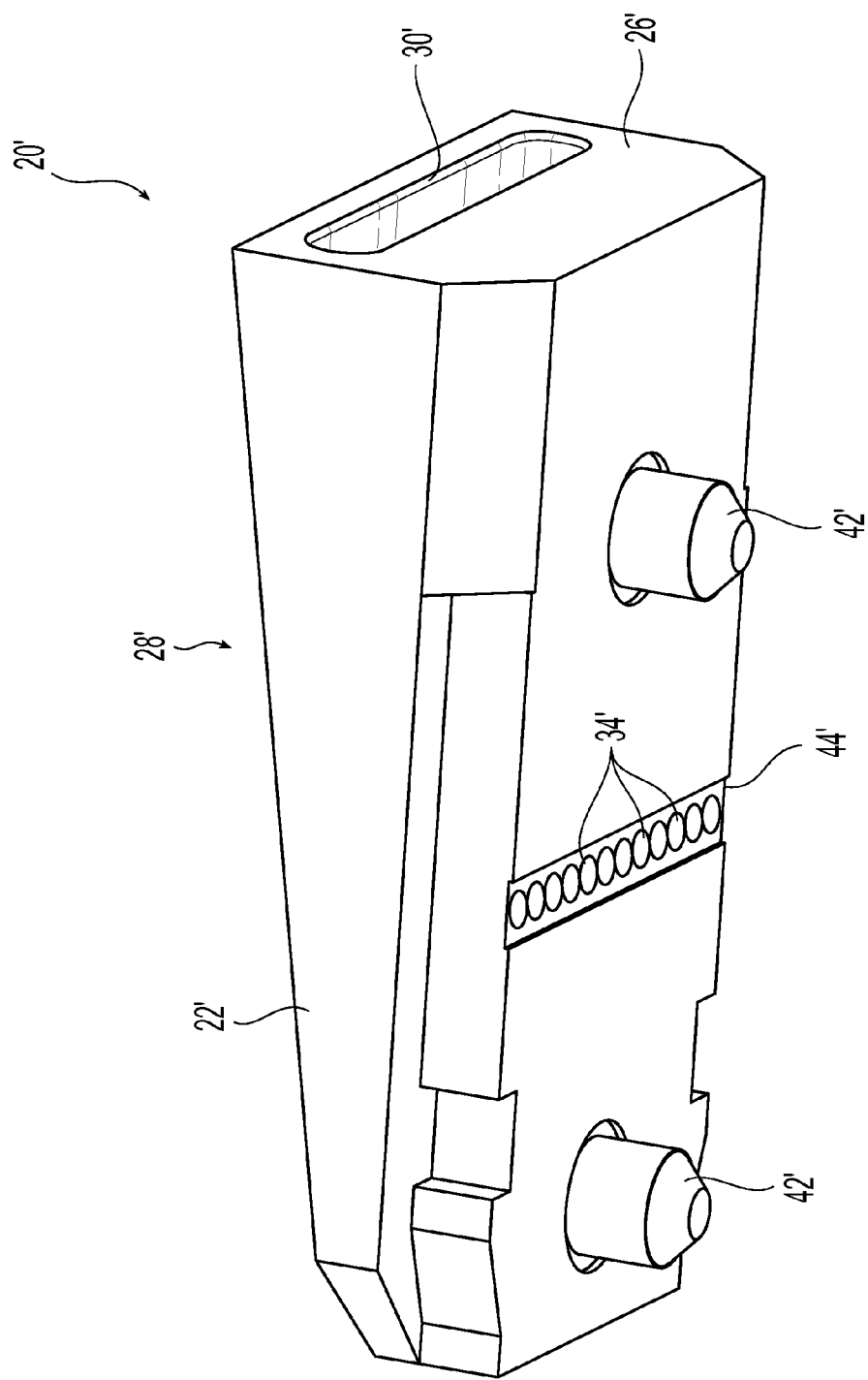
FIG. 12 is a bottom perspective view of another embodiment of a unitary fiber optic ferrule according to the present invention.

FIG. 12 illustrates another embodiment of a unitary fiber optic ferrule 20'. The unitary fiber optic ferrule 20' has a main body 22' and a first opening 30' extending between the back end 26' and a middle portion 28' also configured to receive at least two optical fibers. Unitary fiber optic ferrule 20' has a plurality of lenses 34' in optical surface 44' rather than in optical alignment with the front wall (not shown) as in the prior embodiment. As a result, the light from the optical fibers is reflected off of a flat surface that is exposed to air in a pocket on the upper side of the unitary fiber optic ferrule 20'. The light is then reflected downward toward optical surface 44' and through the plurality of lenses 34'. Alternatively, the light could travel in a reverse direction, i.e., through the plurality of lenses 34' to the reflective surface and into the optical fibers. Additionally, the unitary fiber optic ferrule 20' also includes at least two guide pins 42' to align and secure the fiber optic ferrule 20' to an adapter and receiver portion.

Figure 13:
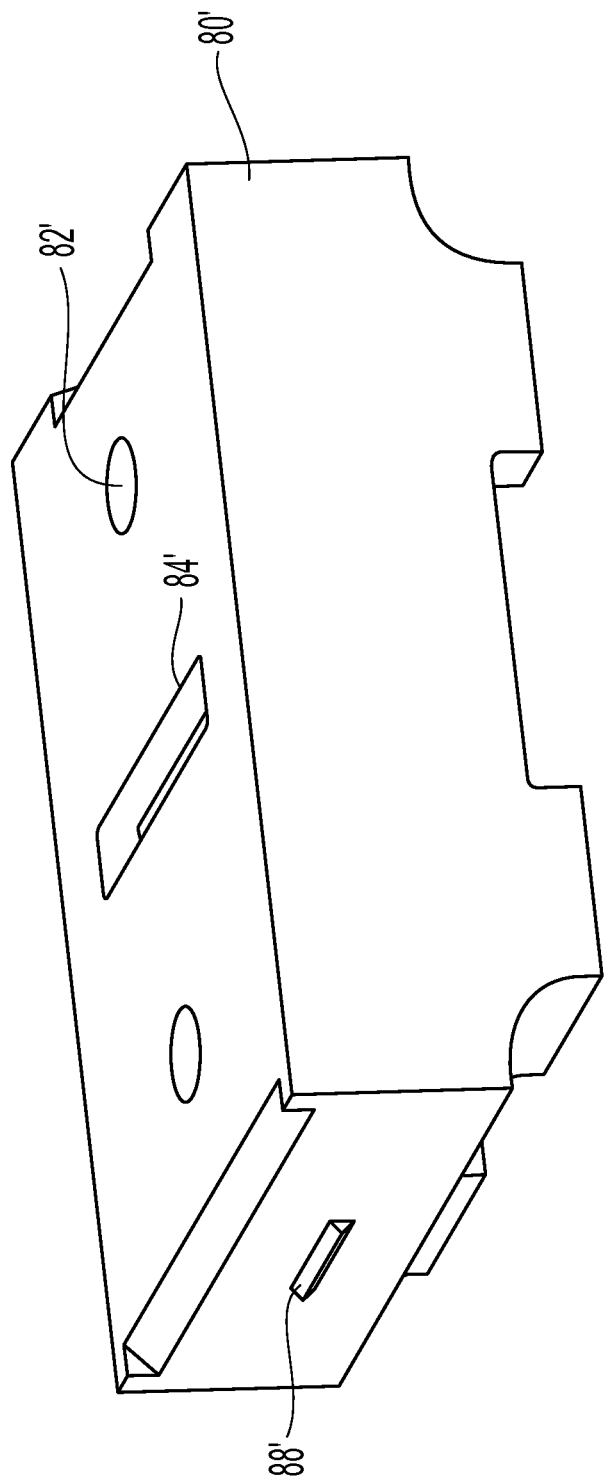
FIG. 13 is a perspective view of an embodiment of a optical component and a optical component portion according to the present invention that can be used with the unitary fiber-optic ferrule.
Figure 14:
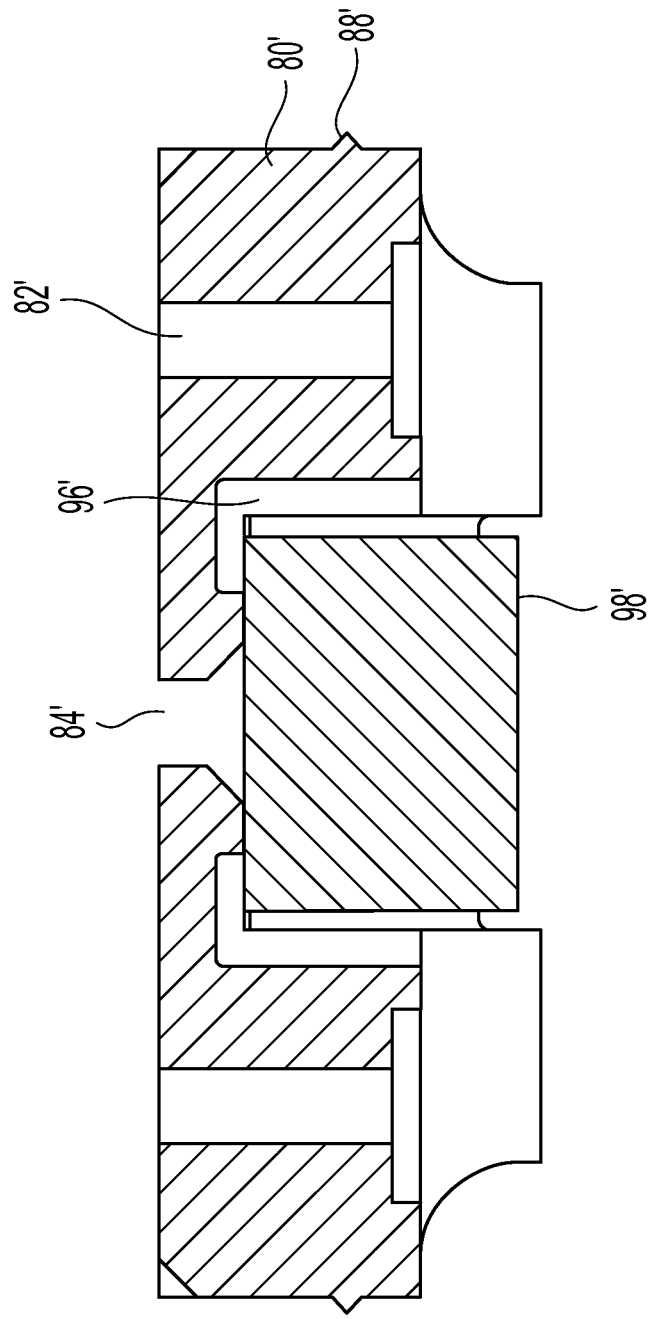
FIG. 14 is a cross-sectional perspective view of the optical component portion of FIG. 13.

FIGS. 13-14 illustrate an alternative optical component portion 80' that can be used with the unitary fiber optic ferrules 20,20' described above. The optical component portion 80' has an optical opening 84' to align with the optical surface 44 of a fiber optic ferrule. The optical component portion 80' includes an opening 96' that is an optical communication with the optical opening 84'. The opening 96' is configured to receive a lens array 98' to transmit light through the optical component portion 80'. While the lens array 98' is illustrated as a unitary piece, it may take any form and fall within the scope of the present invention. The optical component portion 80' can be connected to an optical component assembly in a manner that is known in the art. The optical component portion 80' does not illustrate the small and larger openings at either end to provide a key for the adapter, but those openings, or other key features may be included on optical component portion 80'.

Figure 15:
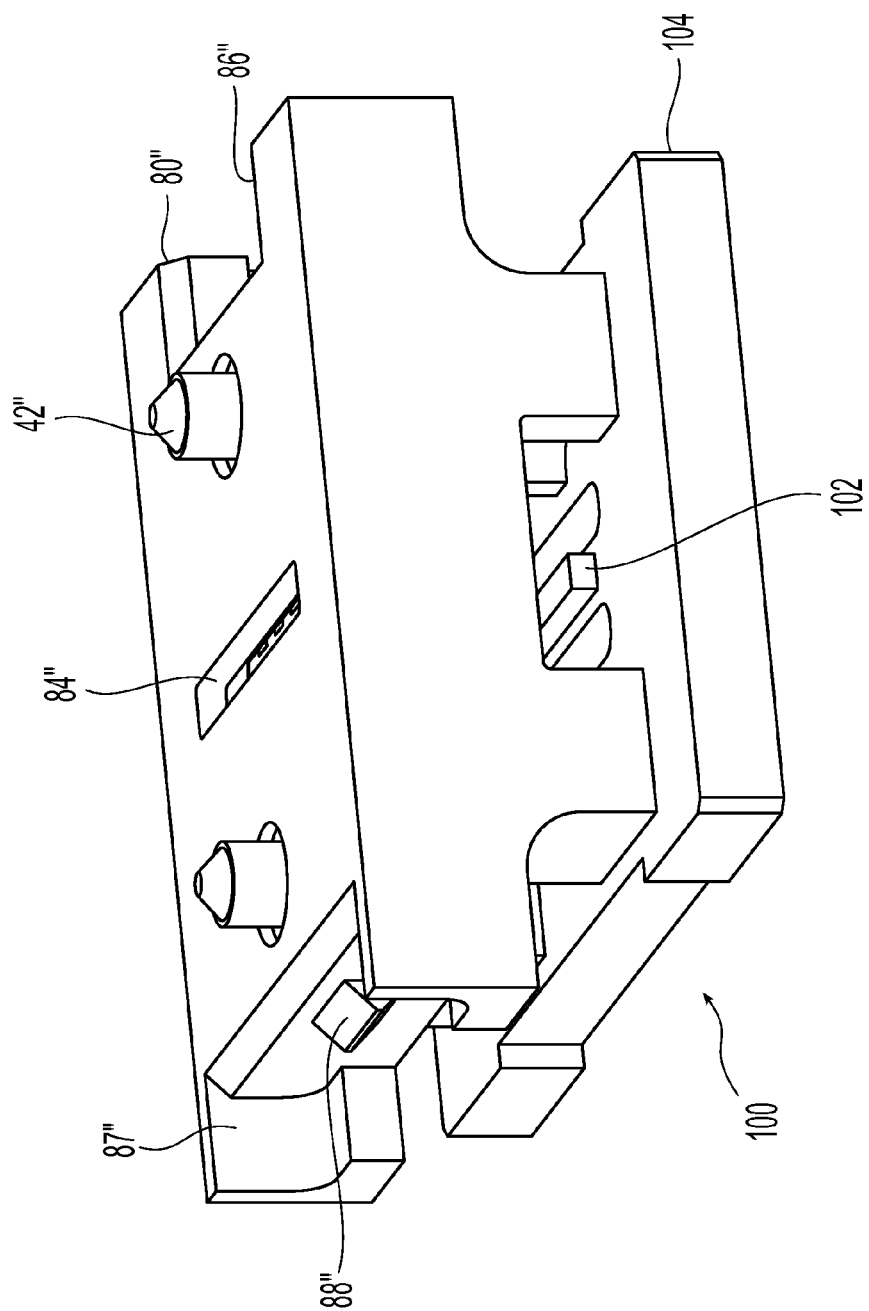
FIG. 15 is a perspective view of another embodiment of an optical component portion according to the present invention on an optical component assembly.
Figure 16:
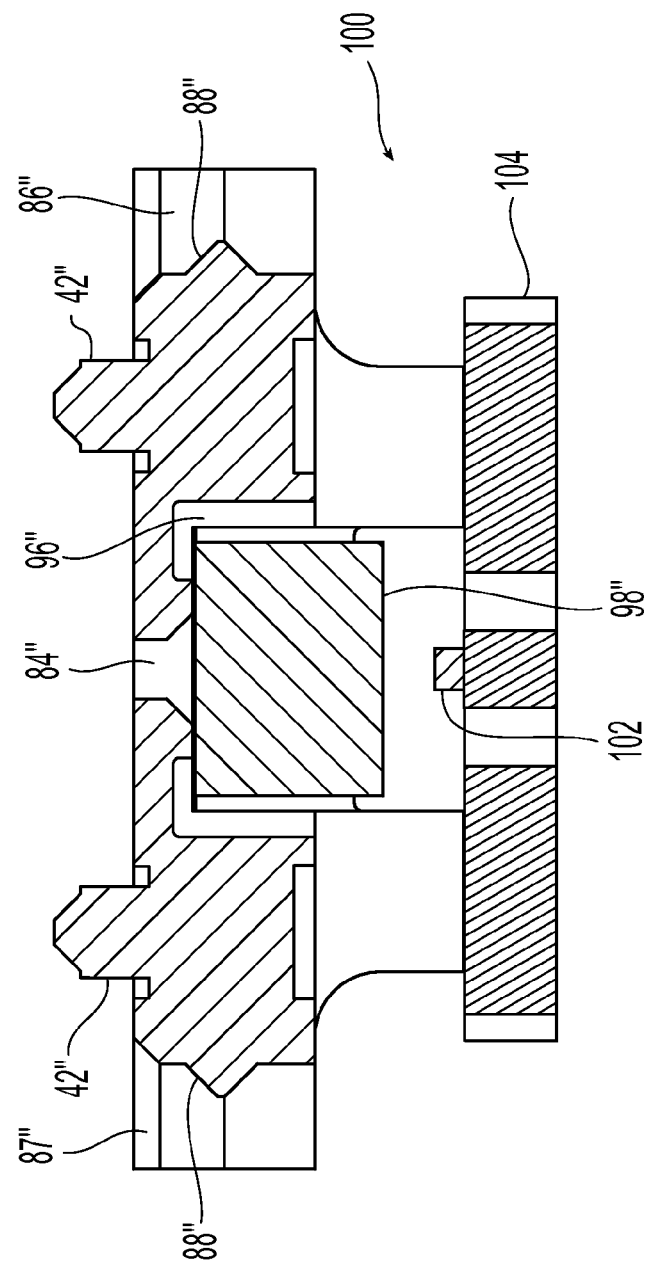
FIG. 16 is a cross-sectional view of FIG. 15.
Figure 17:
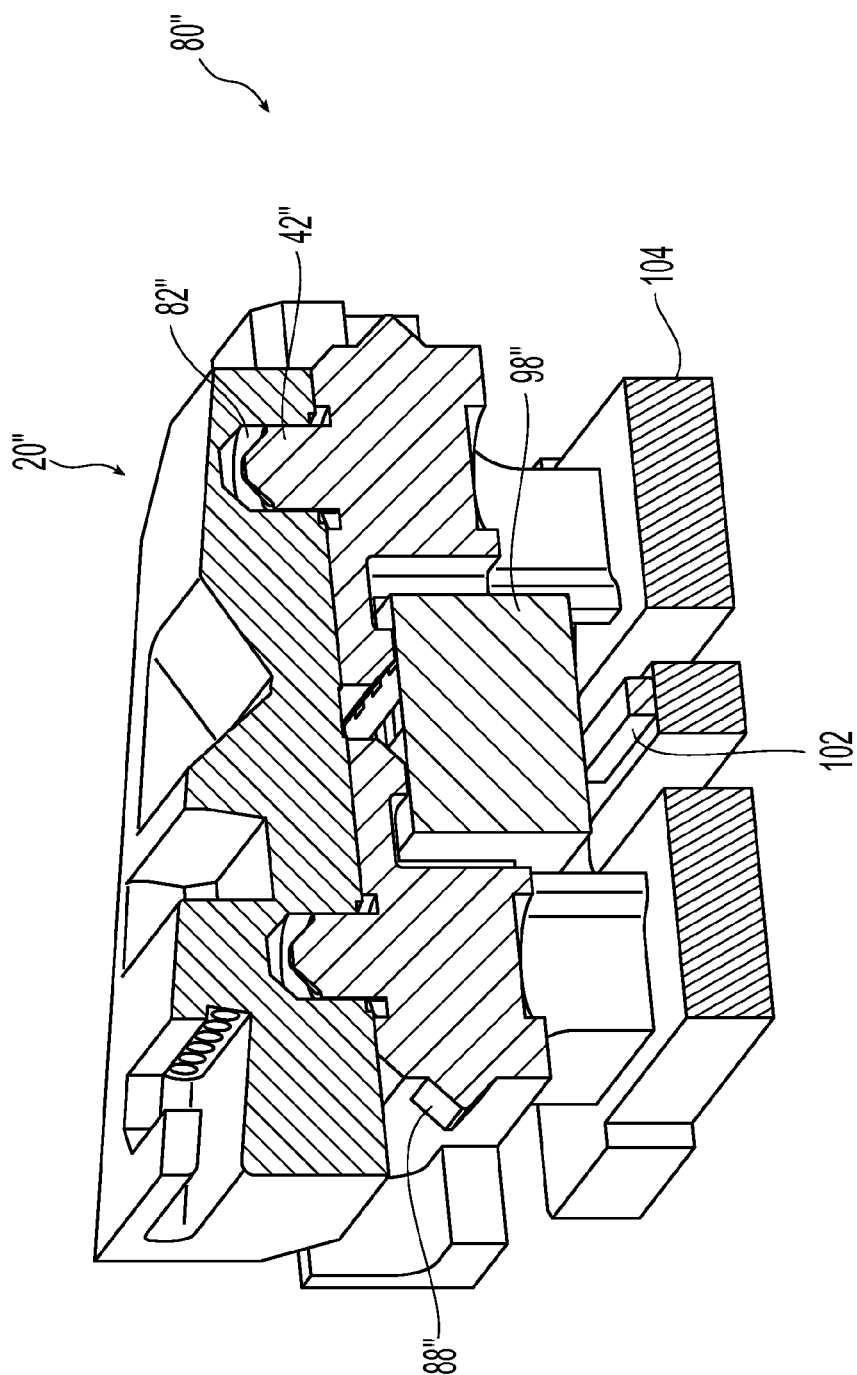
FIG. 17 is a cross-sectional view of the optical component portion of FIG. 15 and a unitary optical ferrule and adapter according to another embodiment of the present invention.

FIGS. 15-17 illustrate another alternative embodiment of a optical component portion 80" and an optical component assembly 100 that includes an optical component 102, which may include either a vertical cavity surface emitting laser (VCSEL) or a detector array, depending on whether the optical component assembly 100 is to emit or receive light. Additionally, the optical component 102 may also be a waveguide intended to emit or receive light. The optical component 102 is supported by a circuit substrate 104 and connected to drivers (not shown) by appropriate connectors (not shown).

The optical component 80" has an optical opening 84" to align with the optical surface 44 of a fiber optic ferrule. The optical component portion 80" includes an opening 96" that is an optical communication with the optical opening 84". The opening 96" is configured to receive a lens array 92" to transmit light through the optical component 80". While the lens array 92" is illustrated as a unitary piece, it may take any form and fall within the scope of the present invention. The optical component 80" is connected to the optical component assembly 100 in a manner that is known in the art. In this embodiment, the optical component 80" has two projections or guide pins 42" rather than the openings in the other embodiments. The guide pins 42" align with openings 82" in an alternative embodiment of a fiber optic ferrule 20" as illustrated in FIG. 17. The front end of the optical component 80" also has a smaller opening 86" than the opening 87" at rear end, thereby preventing the adapter 60 from being misaligned with respect to the optical component 80". The optical component 80" also has projections 88" that engage the adapter 60 as noted above.

FIG. 17 illustrates a fiber optic ferrule 20" that is essentially the same as noted above, but rather than the guide pins extending from the bottom surface, fiber optic ferrule 20" has openings 82" in the bottom surface to receive the guide pins 42" to align the fiber optic ferrule 20" with the optical component 80". It should be noted that fiber optic ferrule 20" is disposed in an adapter 60 as described above, but the adapter is absent in FIG. 17 to allow for clearer illustration.

The optical component 102 would be the VCSEL when the optical component assembly 100 is in the transmit mode and the light path is from the optical component assembly 100 through the lens array 92", through the optical opening 84", and into the fiber optic ferrule and finally into the optical fibers once the light has been turned through about 81° in the fiber optic ferrule 20". Alternatively, the optical component 102 would be a detector array when the light travels from the optical fibers to the optical opening 84", through the lens array 92" and into the detector array.

Figure 18:
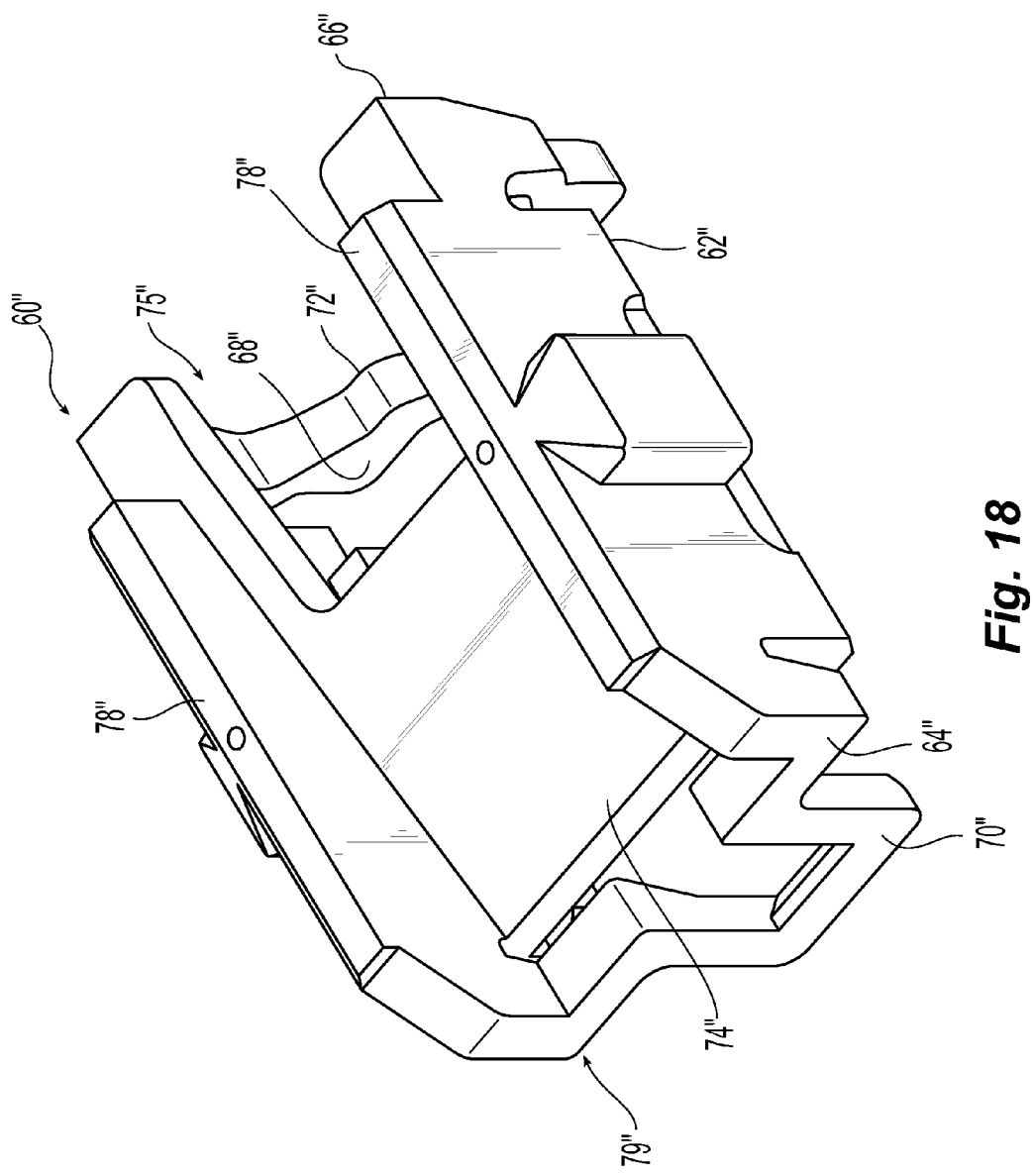
FIG. 18 is a top perspective view of an adapter according to another embodiment of the present invention.

FIG. 18 illustrates an alternative embodiment of an adapter 60" that can be used with the fiber optic ferrules described above. The adapter 60" has a main body 62" having a front end 64", a back end 66", and an opening 68" extending therebetween. The adapter 60" also has a first projection 70" extending downward from the front end 64" and orthogonal to the opening 68". The adapter 60" also has a second projection 72" extending downward from the back end 66" and orthogonal to the opening 68". The first projection 70" is not as wide as the second projection 72" to prevent the adapter 60" (and unitary fiber optic ferrule) from being inserted into the optical component portion 80 backwards. The adapter 60" also has a cover portion 74" extending between the front end 64" and back end 66" and partially defining the opening 68", the cover portion 74" disposed to cover the pocket 38 in the unitary fiber optic ferrule 20. The cover portion 74" seals the pocket 38 and the opening 48 from dust, oil, moisture, or other contaminants to ensure that the lenses 34 do not become contaminated, degrading their reflective properties. The adapter 60" also has side projections 76" that engage the recessed portions 50 of the unitary fiber optic ferrule 20 as discussed above. The upper surface of the cover portion 74" and two side walls 78" make a fiber routing channel 79" for other fiber optic ribbons associated with other assemblies, especially in a tightly packed system. In this embodiment of the adapter 60", the cover portion 74" is reduced in size, leaving an opening 75" extending from the back end 66" to a middle portion of the cover portion 74". This allows for the fiber optic ferrule 20 to first be inserted into the adapter 60" and the optical fibers 90 then to be inserted into the fiber optic connector and then secured therein. The opening 75" allows access to the opening 48 so that epoxy (typically an index matching epoxy) can secure the optical fibers in the fiber optic ferrule. It should be noted however that the cover portion 74" still covers and seals the pocket 38 to prevent debris and contaminants from affecting the optical properties of the fiber optic ferrule.

At will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A unitary fiber optic ferrule comprising:
   a main body having a front end, a back end, and a middle portion disposed between the front end and back end, the main body also having an upper surface and a bottom surface, the upper surface and bottom surface being nonparallel to one another, and the upper surface is tilted at an angle of about 9° relative to the bottom surface;
   a first opening extending between the back end and the middle portion, the first opening configured to receive at least two optical fibers and having a front wall;
   a plurality of lenses in optical alignment with the front wall to reflect light, each of the plurality of lenses having at least one surface exposed to air; and
   at least two alignment features to align the unitary fiber optic ferrule.

2. The unitary fiber optic ferrule according to claim 1, further comprising at least one opening in an upper surface of the main body to allow access to optical fibers inserted into the first opening.

3. The unitary fiber optic ferrule according to claim 1, further comprising a pocket in an upper surface of the main body adjacent the plurality of lenses, the plurality of lenses disposed in the pocket and below the upper surface of the main body.

4. The unitary fiber optic ferrule according to claim 1, further comprising an optical surface on a bottom surface of the main body, the optical surface in optical alignment with the plurality of lenses.

5. The unitary fiber optic ferrule according to claim 1, further comprising:
   an optical surface on a bottom surface of the main body, the optical surface consists of a plurality of lenses.

6. The unitary fiber optic ferrule according to claim 1, further comprising:
   an optical surface on a bottom surface of the main body, wherein the optical surface is recessed compared to the bottom surface.

7. The unitary fiber optic ferrule according to claim 1, further comprising:
   a second opening disposed in the middle portion and adjacent the first opening and having a second front wall; and
   a second plurality of lenses in optical alignment with the second front wall, each of the plurality of lenses have at least one surface exposed to air.

8. The unitary fiber optic ferrule according to claim 1, wherein the main body is molded from an optically clear material.

9. The unitary fiber optic ferrule according to claim 1, wherein the at least two optical fibers are in an optical fiber ribbon.

10. The unitary fiber optic ferrule according to claim 1, wherein the at least two optical fibers comprise twelve optical fibers.

11. The unitary fiber optic ferrule according to claim 1, wherein the alignment features are disposed on a bottom surface of the main body to align the main body with an optical component.

12. The unitary fiber optic ferrule according to claim 1, wherein the alignment features are selected from the group including guide pins, holes, and a combination of guide pins and holes.

13. The unitary fiber optic ferrule according to claim 1, wherein the main body has at least one recessed portion configured to align the main body with an adapter.

14. The unitary fiber optic ferrule according to claim 1, wherein the front wall functions as a physical stop for the at least two optical fibers.

15. The unitary fiber optic ferrule according to claim 1, further comprising openings in the main body to optically align the at least two optical fibers with the plurality of lenses.

16. A method of connectorizing an optical ferrule for attaching to an optical component comprising the steps of:
   providing a unitary optical ferrule having a main body having a front end, a back end, and a middle portion disposed between the front end and back end, a first opening extending between the back end and the middle portion, the first opening configured to receive at least two optical fibers and having a front wall, a plurality of lenses in optical alignment with the front wall to reflect light, each of the plurality of lenses having at least one surface exposed to air;
   securing at least two optical fibers in the optical ferrule with the at least two optical fibers being in optical communication with respective ones of the plurality of lenses; and
   attaching an adapter to the optical ferrule, the adapter configured to mate with the optical component without removing the optical ferrule.

17. The method of connectorizing an optical ferrule according to claim 16, wherein the adapter is attached to the optical ferrule after the at least two optical fibers are secured therein.

18. The method of connectorizing an optical ferrule according to claim 16, wherein the adapter is attached to the optical ferrule before the at least two optical fibers are secured therein.

19. A unitary fiber optic ferrule comprising:
   a main body having a front end, a back end, and a middle portion disposed between the front end and back end;
   a first opening extending between the back end and the middle portion, the first opening configured to receive at least two optical fibers and having a front wall;
   a plurality of lenses in optical alignment with the front wall to reflect light, each of the plurality of lenses having at least one surface exposed to air;
   at least two alignment features to align the unitary fiber optic ferrule; and
   an adapter to hold and align the unitary fiber optic ferrule, the adapter comprising a main body having a front end, a back end, and an opening extending therebetween, a first projection extending downward from the front end and orthogonal to the opening, a second projection extending downward from the back end and orthogonal to the opening, and a cover portion extending between the front end and back end and partially defining the opening, the cover portion disposed to cover at least one opening in the unitary fiber optic ferrule.

20. The unitary fiber optic ferrule according to claim 19, wherein the first and second projections comprise a latching mechanism to attach the adapter to a portion of an optical component.

21. The unitary fiber optic ferrule according to claim 19, wherein the first and second projections have dimensions that are different from one another to act as a key.

22. The unitary fiber optic ferrule according to claim 19, wherein a leading edge of the first and second projections include a chamfered portion.

23. The unitary fiber optic ferrule according to claim 19, wherein the cover portion has an inclined surface and an upwardly extending rail on opposing sides to guide optical fibers from adjacent adapters when installed.

24. The unitary fiber optic ferrule according to claim 19, wherein the unitary fiber optic ferrule is smaller than the opening in the adapter in at least one dimension to allow for relative movement between the ferrule and the adapter.

* * * * *